US012160842B2

(12) United States Patent
Gonzalez et al.

(10) Patent No.: US 12,160,842 B2
(45) Date of Patent: *Dec. 3, 2024

(54) CARRIER INTEGRATION THROUGH USER NETWORK INTERFACE PROXY

(71) Applicant: Google LLC, Mountain View, CA (US)

(72) Inventors: Jonathan Gonzalez, Thalwil (CH); Punyabrata Ray, Mountain View, CA (US); Dutt Kalapatapu, Santa Clara, CA (US); Ji Yang, San Mateo, CA (US); Amol Tuli, Dublin, CA (US); Satheesh Bommakanti, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,547

(22) Filed: Mar. 13, 2023

(65) Prior Publication Data

US 2023/0217402 A1    Jul. 6, 2023

Related U.S. Application Data

(63) Continuation of application No. 17/309,750, filed as application No. PCT/US2019/052684 on Sep. 24, 2019.

(Continued)

(51) Int. Cl.
*H04W 60/04* (2009.01)
*H04L 65/1016* (2022.01)
(Continued)

(52) U.S. Cl.
CPC ......... *H04W 60/04* (2013.01); *H04L 65/1016* (2013.01); *H04L 65/1045* (2022.05);
(Continued)

(58) Field of Classification Search
None
See application file for complete search history.

(56) References Cited

U.S. PATENT DOCUMENTS 9,137,200 B2    9/2015    Blau et al.
9,161,286 B2   10/2015    Enstrom et al.
(Continued)

FOREIGN PATENT DOCUMENTS

JP    2006-303751 A    11/2006
JP    2010-252338 A    11/2010
(Continued)

OTHER PUBLICATIONS

European Search Report for the related Application No. 23187391.0, dated Sep. 1, 2023, 11 pages.

(Continued)

*Primary Examiner* — Frantz Bataille
(74) *Attorney, Agent, or Firm* — Honigman LLP; Brett A. Krueger; Grant Griffith

(57) ABSTRACT

A method for carrier network integration through a user proxy interface includes receiving a request from a mobile device associated with a subscriber of a carrier provider to establish voice services with the carrier provider for a companion device linked to the mobile device. The request includes a subscriber identifier of the mobile device. The method also includes authenticating the companion device based on the subscriber identifier, obtaining session initiation protocol (SIP) credentials corresponding to the subscriber identifier, and registering the SIP credentials for the companion device at a network interface proxy. The network interface proxy is in communication with an internet protocol multimedia subsystem (IMS) of the carrier provider and the companion device. The method also includes establishing voice services between the companion device and the (Continued)

IMS through the network interface proxy using the SIP credentials.

20 Claims, 5 Drawing Sheets

Related U.S. Application Data

(60) Provisional application No. 62/786,919, filed on Dec. 31, 2018.

(51) Int. Cl.
*H04L 65/1045* (2022.01)
*H04L 65/1104* (2022.01)
*H04W 8/18* (2009.01)
*H04L 9/40* (2022.01)

(52) U.S. Cl.
CPC ........... *H04L 65/1104* (2022.05); *H04W 8/18* (2013.01); *H04L 63/166* (2013.01)

(56) References Cited

U.S. PATENT DOCUMENTS

| | | | |
|---|---|---|---|
| 9,432,363 B2 | 8/2016 | Abdulrahiman et al. | |
| 9,531,503 B2 | 12/2016 | Katz et al. | |
| 9,843,885 B2 | 12/2017 | Yerrabommanahalli et al. | |
| 10,341,907 B1* | 7/2019 | Sahin | H04L 65/1073 |
| 2013/0024575 A1 | 1/2013 | Taylor | |
| 2018/0035241 A1* | 2/2018 | Bharadwaj | H04L 65/1094 |

FOREIGN PATENT DOCUMENTS

| | | |
|---|---|---|
| JP | 2012-523199 A | 9/2012 |
| JP | 2013-223161 A | 10/2013 |
| JP | 2015505217 A | 2/2015 |
| JP | 2015519801 A | 7/2015 |
| JP | 2015149724 A | 8/2015 |
| JP | 6008412 B1 | 10/2016 |
| JP | 2018530936 A | 10/2018 |

OTHER PUBLICATIONS

9INTERNATIONAL Search Report, PCT/US2019/052684, Sep. 12, 2019, 9 pages.

Office action from the related Korean application No. 10-2021-7019111 dated Jun. 28, 2022.

Office Action for the related Japanese Application 2021-538313 dated Nov. 1, 2022.

* cited by examiner

CARRIER INTEGRATION THROUGH USER NETWORK INTERFACE PROXY

CROSS REFERENCE TO RELATED APPLICATIONS

This U.S. patent application is a continuation of, and claims priority under 35 U.S.C. § 120 from, U.S. patent application Ser. No. 17/309,750, filed on Jun. 17, 2021, which claims priority under 35 U.S.C. § from PCT/US2019/052684, filed on Sep. 24, 2019, which claims priority under 35 U.S.C. § 119(e) to U.S. Provisional Application 62/786,919, filed on Dec. 31, 2018. The disclosures of these prior applications are considered part of the disclosure of this application and are hereby incorporated by reference in their entireties.

TECHNICAL FIELD

This disclosure relates to carrier integration through a user network interface proxy.

BACKGROUND

Historically, voice call services have been provided over circuit switched networks. Yet as networks have developed, voice call services have evolved to utilize internet protocol (IP) packet-switched networks. For example, Voice over IP (VoIP) delivers voice communication and multimedia sessions over IP networks. With packet-switched networks, voice call services may involve signaling, digitizing of voice signals, and transporting multimedia (e.g., with encoding functionality). As user devices, such as smart devices and multimedia devices, continue to innovate, there is a need to accommodate and/or simplify integration of voice call services for these devices with a network of a carrier provider, especially an IP multimedia subsystem network.

SUMMARY

One aspect of the disclosure provides a method for carrier integration through a user network interface proxy. The method includes receiving, at data processing hardware, a request from a mobile device associated with a subscriber of a carrier provider. The request requesting the data processing hardware to establish voice services with the carrier provider for a companion device linked to the mobile device. The request includes a subscriber identifier of the mobile device. In response to receiving the request, the method includes authenticating, by the data processing hardware, the companion device based on the subscriber identifier of the mobile device; obtaining, by the data processing hardware, session initiation protocol (SIP) credentials corresponding to the subscriber identifier of the mobile device; and registering, by the data processing hardware, the SIP credentials for the companion device at a network interface proxy. The network interface proxy is in communication with an internet protocol multimedia subsystem (IMS) of the carrier provider and the companion device. The method also includes establishing, by the data processing hardware, voice services between the companion device and the IMS through the network interface proxy using the SIP credentials.

Implementations of the disclosure may include one or more of the following optional features. In some implementations, the method further includes, after registering the SIP credentials with the companion device, communicating, from the data processing hardware, media data from the companion device to the IMS of the carrier provider by SIP signaling over a transport layer security connection. In some examples, the network interface proxy receives the SIP signaling from the companion device and forwards the SIP signaling and a real-time transport protocol (RTP) to the IMS of the carrier provider. In these examples, the RTP may correspond to secure RTP and include a key exchange based on datagram transport layer security (DTLS). Communicating the media data may include transcoding the media data received from the companion device into enhanced voice services (EVS) or adaptive multi-rates (AMR) for the IMS of the carrier provider. In some implementations, communicating the media data includes communicating the media data by a media connection employing sessional traversal utilities for network address translation (STUN), network address translation (NAT), or interactive connectively establishment (ICE).

In the implementations that include communicating the media data from the companion device to the IMS of the carrier provider, the method may further include receiving, at the data processing hardware, a second request from the mobile device associated with the subscriber of the carrier provider. Here, the second request includes the subscriber identifier of the mobile device and requests the data processing hardware to establish voice services with the carrier provider for one or more additional companion devices linked to the mobile device. After receiving the second request, the method further includes aggregating, by the data processing hardware, the one or more additional companion devices and the companion device into a combined companion device. Here, the combined companion device is configured to communicate with the IMS of the carrier provider through the network interface proxy over a single transport layer security connection.

In some examples, the subscriber identifier includes an international mobile subscriber identity (IMSI). In some implementations, an application executing on the mobile device generates the request by generating authentication tokens for the subscriber. In these implementations, the authentication tokens are configured to link a phone number associated with the mobile device of the subscriber with the companion device.

The network interface proxy may be optionally configured to manage registration for more than one companion device. Here, the registration managed by the network interface proxy includes a single SIP register per mobile station international subscriber directory number (MSISDN) for the IMS of the carrier provider.

Another aspect of the disclosure provides a system for carrier integration through a user network interface proxy. The system includes data processing hardware and memory hardware in communication with the data processing hardware. The memory hardware stores instructions that when executed on the data processing hardware cause the data processing hardware to perform operations that include receiving a request from a mobile device associated with a subscriber of a carrier provider. The request requesting the data processing hardware to establish voice services with the carrier provider for a companion device linked to the mobile device. The request includes a subscriber identifier of the mobile device. In response to receiving the request, the operations also include authenticating the companion device based on the subscriber identifier of the mobile device; obtaining session initiation protocol (SIP) credentials corresponding to the subscriber identifier of the mobile device; and registering the SIP credentials for the companion device at a network interface proxy. The network interface proxy is in communication with an internet protocol multimedia subsystem (IMS) of the carrier provider and the companion device. The operations also includes establishing voice services between the companion device and the IMS through the network interface proxy using the SIP credentials.

Implementations of the disclosure may include one or more of the following optional features. In some implementations, the operations further include, after registering the SIP credentials with the companion device, communicating media data from the companion device to the IMS of the carrier provider by SIP signaling over a transport layer security connection. In some examples, the network interface proxy receives the SIP signaling from the companion device and forwards the SIP signaling and a real-time transport protocol (RTP) to the IMS of the carrier provider. In these examples, the RTP may correspond to secure RTP and include a key exchange based on datagram transport layer security (DTLS). Communicating the media data may include transcoding the media data received from the companion device into enhanced voice services (EVS) or adaptive multi-rates (AMR) for the IMS of the carrier provider. In some implementations, communicating the media data includes communicating the media data by a media connection employing sessional traversal utilities for network address translation (STUN), network address translation (NAT) traversal, or interactive connectivity establishment (ICE).

In the implementations that include communicating the media data from the companion device to the IMS of the carrier provider, the operations may further include receiving a second request from the mobile device associated with the subscriber of the carrier provider. Here, the second request includes the subscriber identifier of the mobile device and requests the data processing hardware to establish voice services with the carrier provider for one or more additional companion devices linked to the mobile device. After receiving the second request, the operations further include aggregating the one or more additional companion devices and the companion device into a combined companion device. Here, the combined companion device is configured to communicate with the IMS of the carrier provider through the network interface proxy over a single transport layer security connection.

In some examples, the subscriber identifier includes an international mobile subscriber identity (IMSI). In some implementations, an application executing on the mobile device generates the request by generating authentication tokens for the subscriber. In these implementations, the authentication tokens are configured to link a phone number associated with the mobile device of the subscriber with the companion device.

The network interface proxy may be optionally configured to manage registration for more than one companion device. Here, the registration managed by the network interface proxy includes a single SIP register per mobile station international subscriber directory number (MSISDN) for the IMS of the carrier provider.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
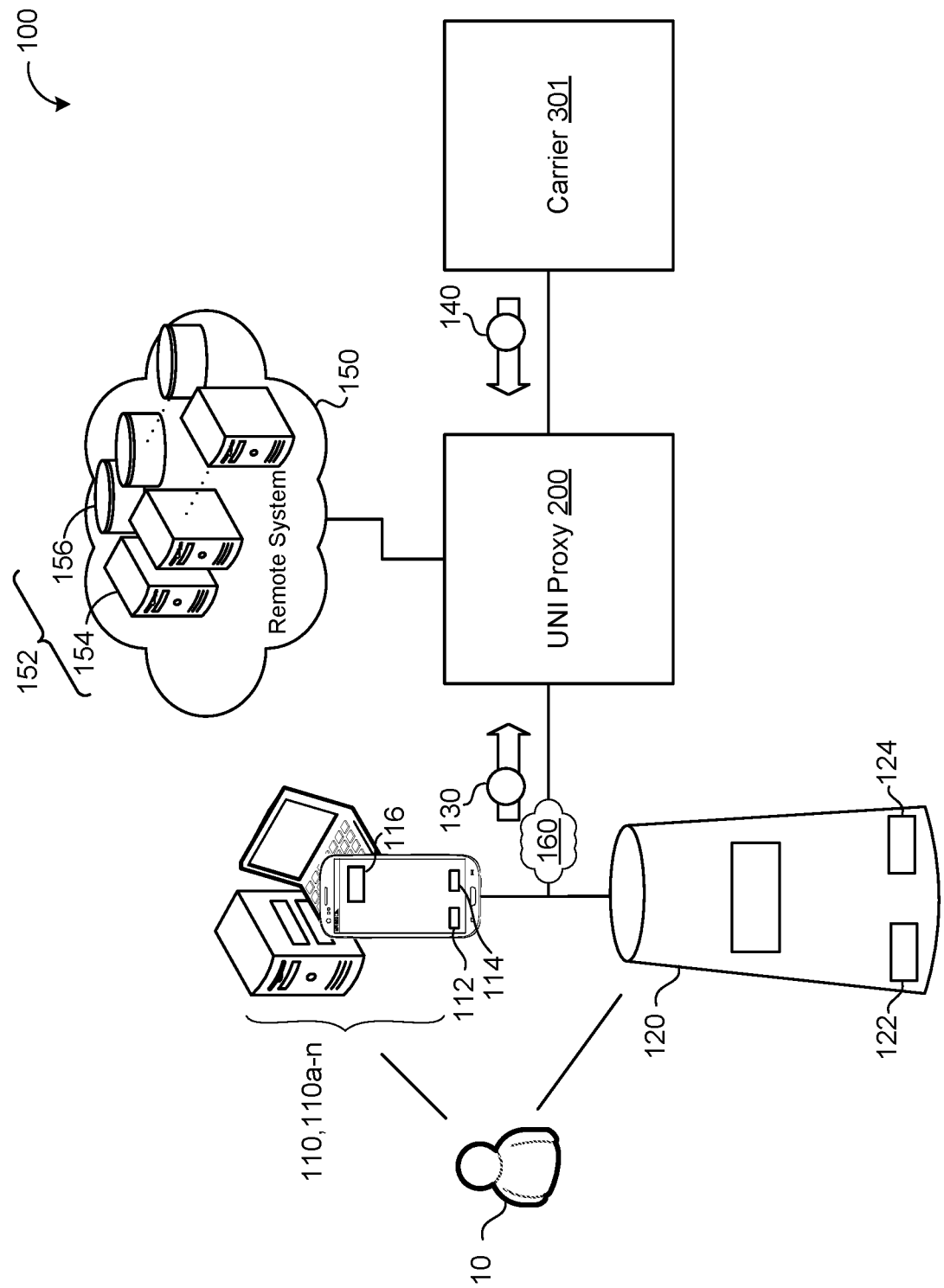
FIG. 1 is a schematic view of an example network interface proxy environment.

FIG. 1 is an example of a network interface proxy environment 100. The network interface proxy environment 100 includes a subscriber 10 associated with (e.g., owner or user of) at least one primary device 110 and at least one companion device 120 as endpoints for voice call services. Here, the endpoints 110, 120 allow the subscriber 10 who subscribes to services of a carrier 301 to communicate with infrastructure of the carrier 301 via a user network interface (UNI) proxy 200. The endpoints 110, 120 generally refer to devices or to applications (e.g., browsers) hosted on devices. More particularly, these devices may be mobile devices (e.g., mobile phones, tablets, laptops, etc.) or user devices (e.g., voice communication and/or multimedia devices). For example, FIG. 1 depicts the primary device 110 as a mobile device and the companion device 120 as a user device configured with voice call services (e.g., with audio, video, or multimedia data capabilities). Each of the primary device 110 and the companion device 120 includes data processing hardware 112, 122 and memory hardware 114, 124. The memory hardware 114, 124 is in communication with the data processing hardware 112, 122 and stores instructions, that when executed by the data processing hardware 112, 122, cause the data processing hardware 112, 122 to perform one or more operations. Although FIG. 1 depicts more than one primary device 110, 110a—n and one companion device 120, the subscriber 10 may use any number of primary devices 110 and any number of companion devices 120 with a network (e.g., the network 320 of FIGS. 2A and 2B) of the carrier 301. Accordingly, the number of companion devices 120 may be unrelated to the number of primary devices 110. For example, one primary device 110 may have four companion devices 120.

The voice call services of an endpoint (e.g., the primary device 110 or the companion device 120) may include any type of media data capable of being communicated across a packet-switched network. In other words, an endpoint may communicate captured audio, video, multimedia, text (e.g., messaging), etc. For example, each endpoint (e.g., the primary device 110 or the companion device 120) may include an audio capture device (e.g., a microphone) and/or a video capture device (e.g., a camera) to conduct voice call services for the subscriber 10. In order to communicate media associated with a call, endpoints 110, 120 may be configured with a variety of protocols to communicate through the UNI proxy 200 with the carrier 301. These protocols may include authentication protocols, signal protocols, transport protocols, etc.

In some implementations, the primary device 110 refers to a device registered on behalf of the subscriber 10 with the carrier 301. Even though the subscriber 10 may be able to place a call with the primary device 110, the subscriber 10 may, nonetheless, prefer or wish to place a call over the network (e.g., the network 320) of the carrier 301 with a device other than the primary device 110. This may be increasingly the case as the subscriber 10 acquires more devices capable of communicating across a network. In order to place a call with a device other than the primary device 110, the subscriber 10 may integrate the companion device 120 as a secondary device for voice services with the carrier 301. In other words, the companion device 120 refers to an additional or secondary device of the subscriber 10 that is associated with the primary device 110 on the subscriber's account with the carrier 301. Here, integration of a device with the carrier 301 refers to configuring a device to be recognized as an authorized device/user of the carrier 301 that may perform voice call services or call multimedia services using the network (e.g., the network 320) of the carrier 301.

In some implementations, the subscriber 10 links the companion device 120 to the primary device 110. Here, linking refers to associating the companion device 120 with the primary device 110 such that the carrier 301 may identify either device as authorized to communicate using the network 320 (e.g., an IP multimedia subsystem (IMS) or simply a Carrier IMS Core) of the carrier 301. For example, the primary device 110 includes an application 116 (i.e., executing/running on the data processing hardware 112) that is able generate an authentication procedure for the subscriber 10. In some examples, the application 116 is responsible for designating a phone number (e.g., mobile station international subscriber directory number (MSISDN)) for integration with the carrier 301 on behalf of any of the subscriber's devices 110, 120. Moreover, the application 116 may be responsible for sending a request 130 to the UNI proxy 200 to enable voice services to be integrated with the carrier 301. In some implementations, all endpoints 110, 120 of the subscriber 10 use the same phone number to integrate with the carrier 301 through the UNI proxy 200.

In some examples, in order to onboard and to activate voice services (e.g., voice calling) through a companion device 120, the application 116 may trigger an entitlements procedure. An entitlement procedure may ensure that an endpoint or a user of the endpoint is entitled to, or subscribed to, voice services with the carrier 301. In some implementations, the entitlement procedure also retrieves session initiation protocol (SIP) credentials 140 from the carrier 301 to allow the companion device 120 to register with an IP multimedia subsystem (IMS) network 320 (e.g., FIGS. 2A and 2B) of the carrier 301. As used herein, the terms "IMS 320" and "IMS network 320" are used interchangeably. Once registered, the companion device 120 may place and/or receive voice call services with the carrier 301.

In some configurations, the endpoints 110, 120 communicate with the UNI proxy 200 through a remote system 150 over a network 160. For example, the UNI proxy 200 is remotely hosted in a network environment (e.g., distributed system or cloud) accessible to the subscriber 10. For instance, the UNI proxy 200 may be a web-based application accessible to the subscriber 10 (e.g., remotely accessible to an endpoint 110, 120). By being hosted in a remote system 150, the UNI proxy 200 may function using computing resources 152 of the remote system 150. These computing resources 152 may include remote data processing hardware 154 (e.g., servers) and remote memory hardware 156 (e.g., remote databases hosted in memory hardware). In other configurations, the UNI proxy 200 is integrated with the companion device 120 such that the data processing hardware 122 located on the companion device 120 may execute the functionality of the UNI proxy 200 to enable direct communication between an IMS network 320 of the carrier 301 and the companion device 120. For example, in such configurations, the companion device 120 is configured with an IMS (i.e., an IMS client).

The UNI proxy 200 functions to connect to a network (e.g., the network 320) of a carrier 301 by mimicking a traditional network supported by end user equipment (UE) (e.g., IR.51). By mimicking the traditional network, the UNI proxy 200 simplifies device management for a subscriber 10 of the carrier 301. With the UNI proxy 200, the subscriber 10 may be able to scale a number of endpoints 110, 120 using the network (e.g., the network 320) of the carrier 301 without concerns of device compatibility with the carrier 301. Accordingly, endpoints 110, 120 may be updated, replaced, reconfigured, etc. at the subscriber level without affecting the endpoints' 110, 120 functionality for voice services with the carrier 301. In some examples, the UNI proxy 200 is able to improve privacy and/or endpoint security by making each endpoint 110, 120 indistinguishable when viewed by the carrier 301. In other words, the UNI proxy 200 may make each device communicating with the carrier 301 through the UNI proxy 200 look similar (e.g., the primary device 110 appears identical to the companion device 120). In some implementations, inversely, a carrier 301 may make changes in coordination with the UNI proxy 200 without affecting the endpoints of the subscriber 10.

Figure 2A:
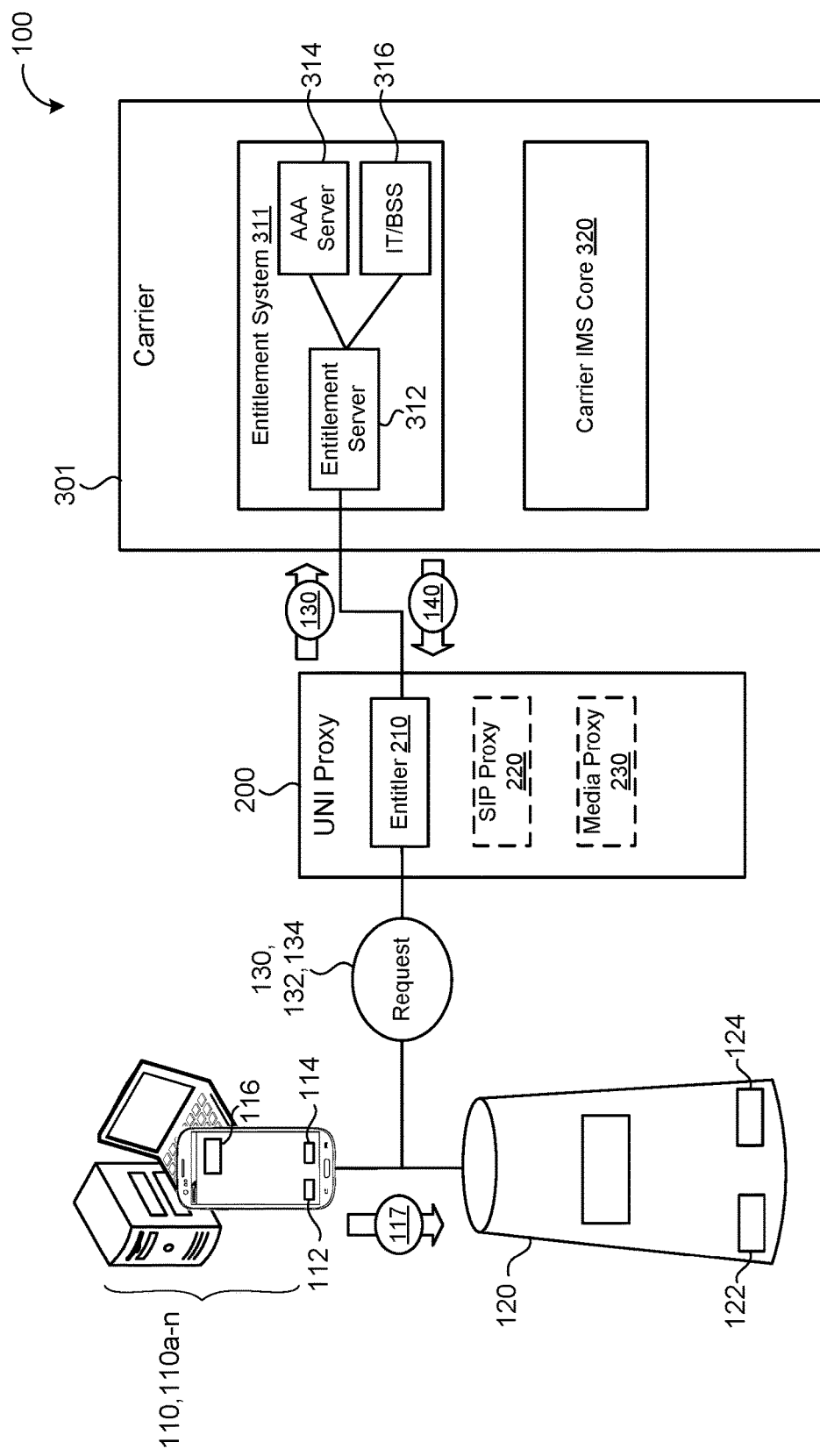
FIGS. 2A and 2B are schematic views of example network interface proxies within the network interface proxy environment.
Figure 2B:
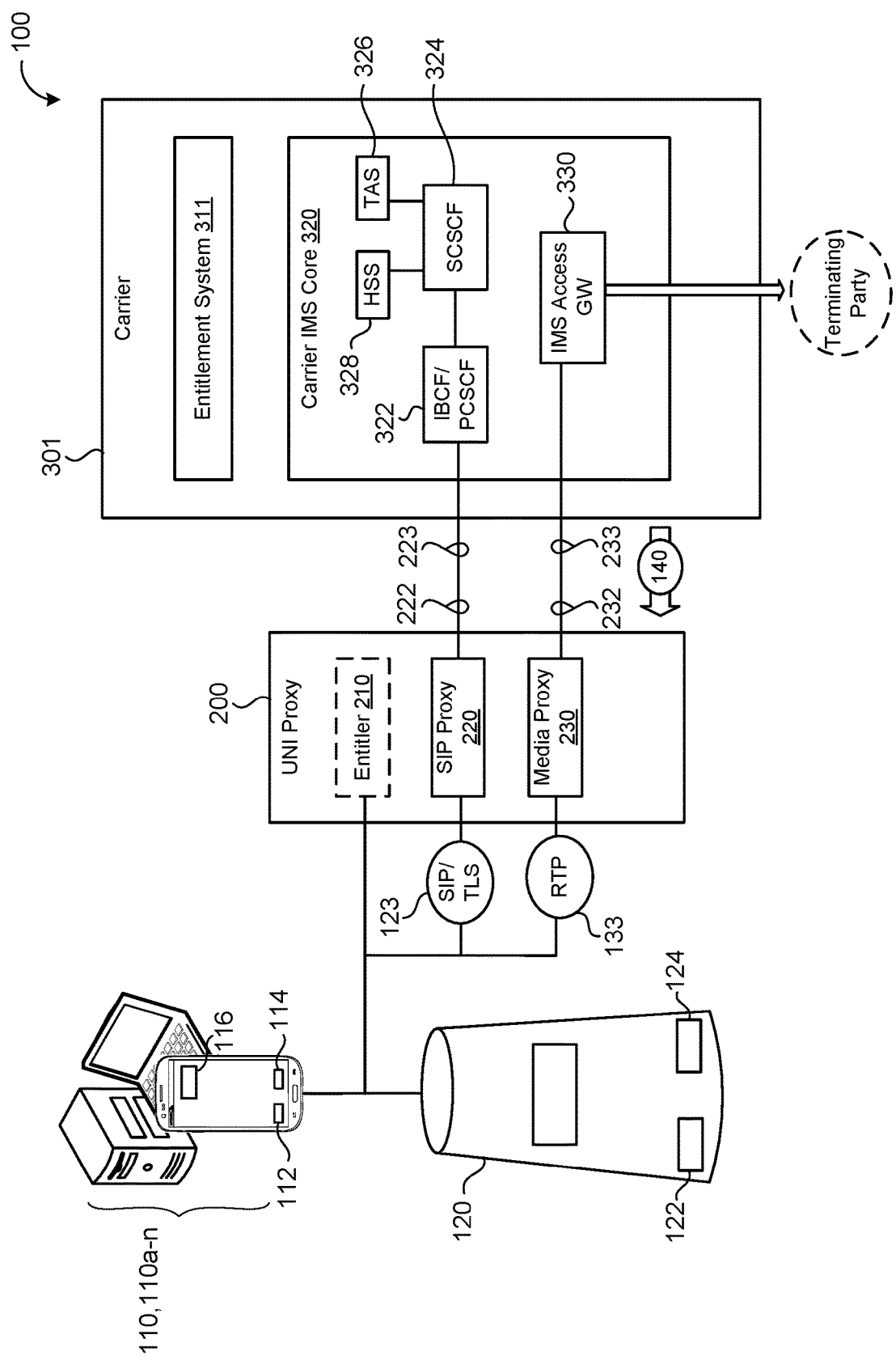

FIGS. 2A and 2B are examples of the UNI proxy 200 and its relation between endpoints of the subscriber 10 and the carrier 301 within the network interface proxy environment 100. The UNI proxy 200 includes an entitler 210, a session initiation protocol (SIP) proxy 220, and a media proxy 230. Using the UNI proxy 200, the endpoints 110, 120 may be configured to terminate calls using the network 320 of the carrier 301. To illustrate the functionality of the UNI proxy 200, FIGS. 2A and 2B depict a network 320 for a carrier 301. Telecommunication service providers (also referred to as carrier providers) use carrier networks, often with proprietary network infrastructure to provide voice call services to subscribers 10.

Here, the carrier 301 is shown to include an entitlement system 311 and an IMS network 320 (also referred to as Carrier IMS core 320). The IMS network 320 generally refers to an IP multimedia subsystem (IMS) that is intended to provide a unified service architecture for packet-switched networks. Often, the IMS network 320 operates on several layers including an application layer, a control layer, and an access and transport layer to allow multimedia data to be communicated. Although the carrier 301 is shown to include an entitlement system 311 and an IMS network 320, other components and/or infrastructure may be added or removed from the carrier 301 without altering the functionality of the UNI proxy 200 as an interface between the carrier 301 and endpoints 110, 120.

Referring to FIG. 2A, the entitler 210 is configured to perform the authentication procedure and the entitlement procedure. The entitler 210 receives the request 130 to establish voice services with the carrier 301 for a companion device 120 linked to the primary device 110. The request 130 includes a subscriber identifier 132, such as, for example, a MSISDN, an IMS public user identity (IMPU), or an international mobile subscriber identity (IMSI). In some implementations, the application 116 communicates the request 130 with the subscriber identifier 132 from the primary device 110. In other implementations, the companion device 120 may initiate the request 130 based on communication with the primary device 110. In some examples, the request 130 further includes an authentication token 134 (e.g., generated by the application 116) as an authentication credential to identify the subscriber 10 for the UNI proxy 200. The authentication token 134 may be an open authentication (OAuth) token, a message as a one-time password (e.g., SMS OPT), or an extensible authentication protocol (EAP) (e.g., an authentication and key agreement mechanism (EAP-AKA)). Additionally or alternatively, the authentication token 134 links a phone number associated with the primary device 110 (e.g., a mobile device) of the subscriber 10 with the companion device 120.

Based on the request 130, the entitler 210 performs an entitlement procedure communicating with the carrier 301. To initiate the entitlement procedure, the entitler 210 communicates the request 130 to the carrier 301. For example, FIG. 2A depicts an entitlement server 312 receiving the request 130. Here, at the entitlement server 312, the carrier network 320 may also include an authentication, authorization and accounting (AAA) server 314 and/or an information technology (IT)/business support system (BSS) 316 to aid with the entitlement procedure at the carrier 301. In some examples, the entitler 210 and the carrier 301 (e.g., the entitlement server 312) communicate through an entitlement application programming interface (API).

With the request 130 from the entitler 210, the entitlement server 312 confirms authentication based on the subscriber identifier 132. For example, the entitlement server 312 determines the subscriber identifier 132 matches an identifier for known subscribers of the carrier 301 (e.g., stored at the entitlement server 312 or another component of the carrier 301). When the carrier 301 authenticates the request 130, the UNI proxy 200 may receive or obtain SIP credentials 140 corresponding to the subscriber identifier 132 (e.g., the subscriber identifier 132 of the primary device 110). In some implementations, the application 116 receives the SIP credentials 140 and provides the SIP credentials 140 to the UNI proxy 200 (e.g., to the SIP proxy 220 of the UNI proxy 200). Here, the application 116 or UNI proxy 200 receives the SIP credentials 140 to indicate that the companion device 120 has been successfully authenticated. In some configurations, the UNI proxy 200 or the application 116 generates an access token 117 for the companion device 120 as an indicator that the companion device 120 has been authenticated by the carrier 301 and to facilitate SIP registration on behalf of the companion device 120.

Referring to FIG. 2B, with the SIP credentials 140, the UNI proxy 200 registers the companion device 120 with the carrier 301. Registering the companion device 120 with the carrier 301 establishes voice services between the companion device 120 and the carrier 301 (e.g., with the IMS network 320) through the UNI proxy 200. Registration of the companion device 120 may allow both the UNI proxy 200 and the carrier 301 to know that the companion device 120 is established and permitted to use voice services of the carrier 301.

In some examples, the UNI proxy 200 registers the SIP credentials 140 at the SIP proxy 220 such that the SIP proxy 220 may establish communication between the companion device 120 and the carrier 301. For instance, the SIP proxy 220 includes a database storing SIP credentials 140 and any relevant data to perform registration. Here, the UNI proxy 200 controls and proxies registrations related to the carrier 301 on behalf of endpoints such that, for example, each unique subscriber identifier 132 may appear similar to the carrier 301 and not cause any additional impact on the carrier 301. In other words, the UNI proxy 200 (e.g., at the SIP proxy 220) manages registration on behalf of companion devices 120. In some examples, the UNI proxy 200 manages the registration such that only one SIP register per subscriber identifier 132 (e.g., MSISDN or IMPU) is relayed to an IMS network 320 of the carrier 301 at a time (e.g., in order to control or to optimize network flow to the carrier 301). In some implementations, an endpoint, such as the companion device 120, once registered, stays registered with the carrier 301 until deciding to disconnect. In other implementations, the UNI proxy 200 manages an endpoint such that the endpoint connects and/or disconnects with the carrier 301 on demand.

With continued reference to FIG. 2B, after registering the SIP credentials 140 for the companion device 120, the SIP proxy 220 of the UNI proxy 200 is configured to communicate with the IMS network 320 (e.g., shown as the carrier IMS core). In some examples, an interface between the SIP proxy 220 and the carrier 301 is a standard Gm interface. Traditionally, a Gm interface refers to an interface that supports an exchange of messages between SIP user equipment (UE) or a VoIP gateway and a proxy-call session control function (P-CSCF). Accordingly, the Gm interface enables connectivity between the UE and the IMS network 320 for registration, authentication, encryption, and session control. In the case of the UNI proxy 200, a Gm interface 222 enables connectivity between the P-CSCF 322 of the IMS network 320 and a SIP endpoint (e.g., the primary device 110 or the companion device 120), rather than a UE. In some configurations, as shown by FIG. 2B, the SIP proxy 220 communicates from an endpoint to the P-CSCF 322 by SIP signaling 223 over a transport layer security (TLS) connection through the Gm interface 222. Alternatively, the carrier 301 may choose to interface with the SIP proxy 220 with an interconnection border control function (IBCF) using a local communication interface (LCI). In either configuration, the P-CSCF 322 or the IBCF of the IMS network 320 may communicate with a serving call state control function (S-CSCF) 324 and servers 326, 328, such as, for example, a telephony application server (TAS) 326 and a third party registration server (HSS) 328.

In some examples, the UNI proxy 200 is configured to forward SIP signaling 223 with the SIP proxy 220 and media data 233 (e.g., multimedia data) with the media proxy 230. For instance, the media proxy 230 receives multimedia data 233 (e.g., audio and/or video) from the companion device 120 through a network protocol 133, such as real-time transport (RTP) protocol, and forwards the multimedia data 233 to the IMS network 320 through a media proxy connection 232. In some examples, the media proxy connection 232 is configured to communicate with an IMS access gateway 330 at the IMS network 320. Generally speaking, the IMS access gateway 330 ensures that addresses (e.g., of an initiating and terminating party) that are associated with inbound and/or outbound media streams (i.e. media data) are correct (e.g., much like a network address translation (NAT) function). In some implementations, the media proxy 230 uses secure RTP (sRTP) for media encryption of the media data through the media proxy connection 232. In these implementations, the media encryption may include a key exchange using datagram transport layer security (DLTS). Alternatively, the media encryption may use a simplified data encryption standard (S-DES).

The UNI proxy 200 may also support NAT traversal when communicating media data 233 between an endpoint and the carrier 301. In some examples, the UNI proxy 200 employs an interactive connectivity establishment (ICE) to establish a connection path with the carrier 301. For example, ICE uses sessional traversal utilities for NAT (STUN) or a STUN server to communicate the media data 233 for the subscriber 10. In some examples, a STUN server allows a subscriber 10 at an endpoint to discover information related to IP addresses and a type of the NAT being used to establish a media connection.

In some configurations, the UNI proxy 200 (e.g., at the media proxy 230) is configured to transcode the media data received from the endpoint (e.g., the primary device 110 or the companion device 120). In some examples, the UNI proxy 200 supports media options such as G.711, G.722, and/or Opus. In some implementations, the UNI proxy 200 supports multiple-allowable bit—rates within the same codec. For example, the UNI proxy 200 uses adaptive multi-rates such as adaptive multi-rate narrow band (AMR-NB) or adaptive multi-rate wide band (AMR-WB) to transcode media received from the endpoints. Additionally or alternatively, the UNI proxy 200 supports high-definition voice codecs, such as enhanced voice services (EVS). For instance, the UNI proxy 200 operates with both EVS and AMR bands. In some configurations, the UNI proxy 200 provides media data directly to the carrier 301 without processing.

By having the UNI proxy 200 provide media data support services (e.g., transcoding), the UNI proxy 200 may simplify the use of codecs and/or codec support between endpoints 110, 120 and the carrier 301. In contrast, when endpoints individually support codecs (e.g., each multimedia device licenses a given codec), licensing fees may become expensive on a per endpoint basis. Licensing management at the UNI proxy 200 may allow the subscriber 10 to utilize less licenses and/or support more codecs across more devices. In other words, the UNI proxy 200 acquires and/or implements licenses rather than an endpoint (or each endpoint).

In some examples, the UNI proxy 200 receives a second request 130 from the primary device 110 associated with the subscriber 10 of the carrier 301. Here, the second request 130 is to establish voice services for one or more additional companion devices linked to the primary device 110. Much like the first request 130, the second request 130 includes the subscriber identifier 132 of the primary device 110. In this example, the UNI proxy 200 is configured to aggregate the one or more companion devices 120 and the companion device 120 into a combined companion device where UNI proxy 200 manages the combined companion device (or more than one companion device 120) such that the combined companion device is communicated over a single TLS connection 123.

In some implementations, the UNI proxy 200 retrieves registration data for an endpoint. With the registration data, the UNI proxy 200 may verify when the voice call service is still active for the subscriber 10. Accordingly, this step confirms that an endpoint is registered at a time when a call is placed using the network 320 of the carrier 301.

Figure 3:
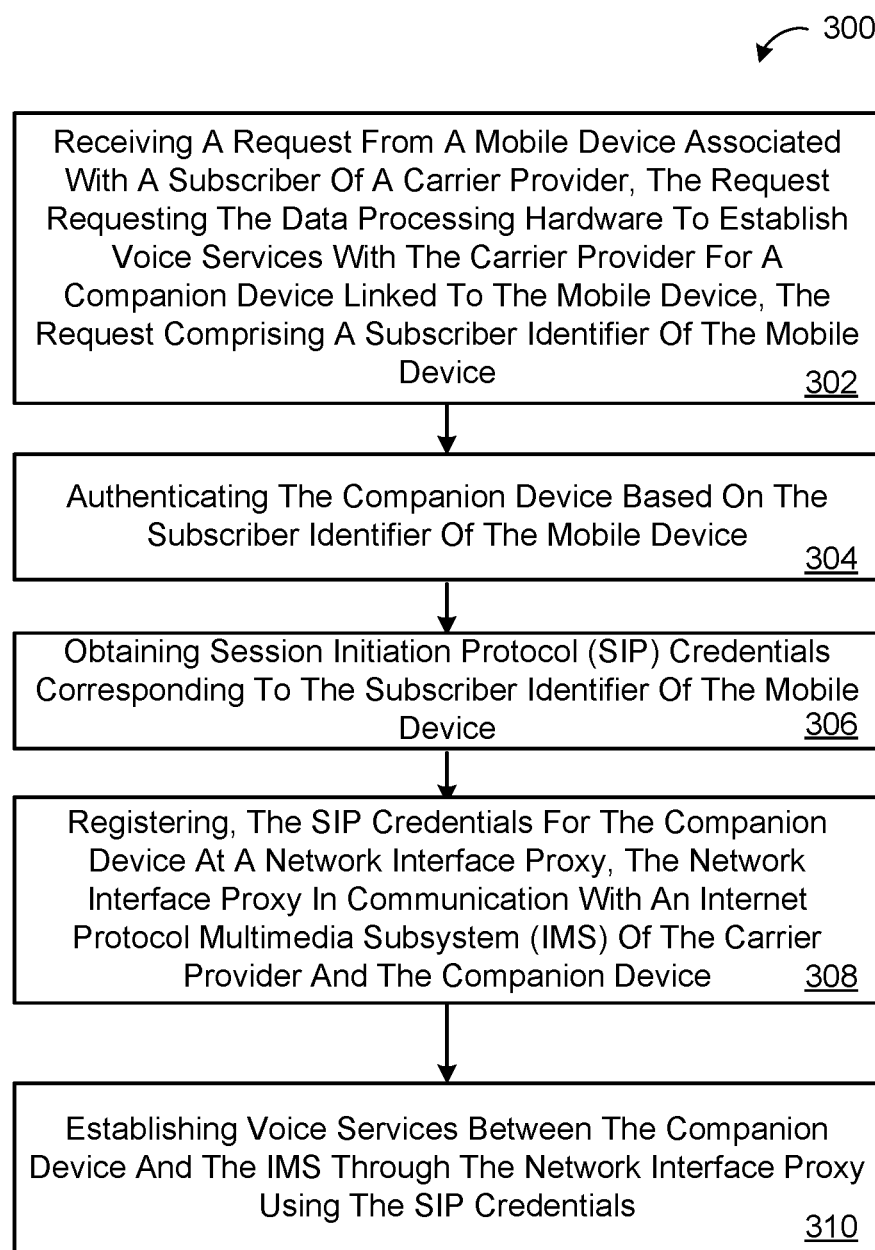
FIG. 3 is a flow diagram of an example arrangement of operations for a method of implementing a network interface proxy.

FIG. 3 is an example of an example arrangement of operations for a method 300 of establishing voice services with the UNI proxy 200. At operation 302, the method 300 receives a request 130 from a mobile device (e.g., a primary device 110) associated with a subscriber 10 of a carrier 301. Here, the request 130 requests the establishment of voice services with the carrier 301 for a companion device 120 linked to the mobile device 110 and includes a subscriber identifier 132 of the mobile device. At operation 304, the method 300 authenticates the companion device 120 based on the subscriber identifier 132 of the mobile device. At operation 306, the method 300 obtains session initiation protocol (SIP) credentials 140 that correspond to the subscriber identifier 132 of the mobile device. At operation 308, the method 300 registers the SIP credentials 140 for the companion device 120 at a UNI proxy 200. The UNI proxy 200 is in communication with an internet protocol multimedia subsystem (IMS) network 320 of the carrier 301 and the companion device 120. At operation 310, the method 300 establishes voice services between the companion device 120 and the IMS network 320 through the UNI proxy 200 using the SIP credentials 140.

Figure 4:
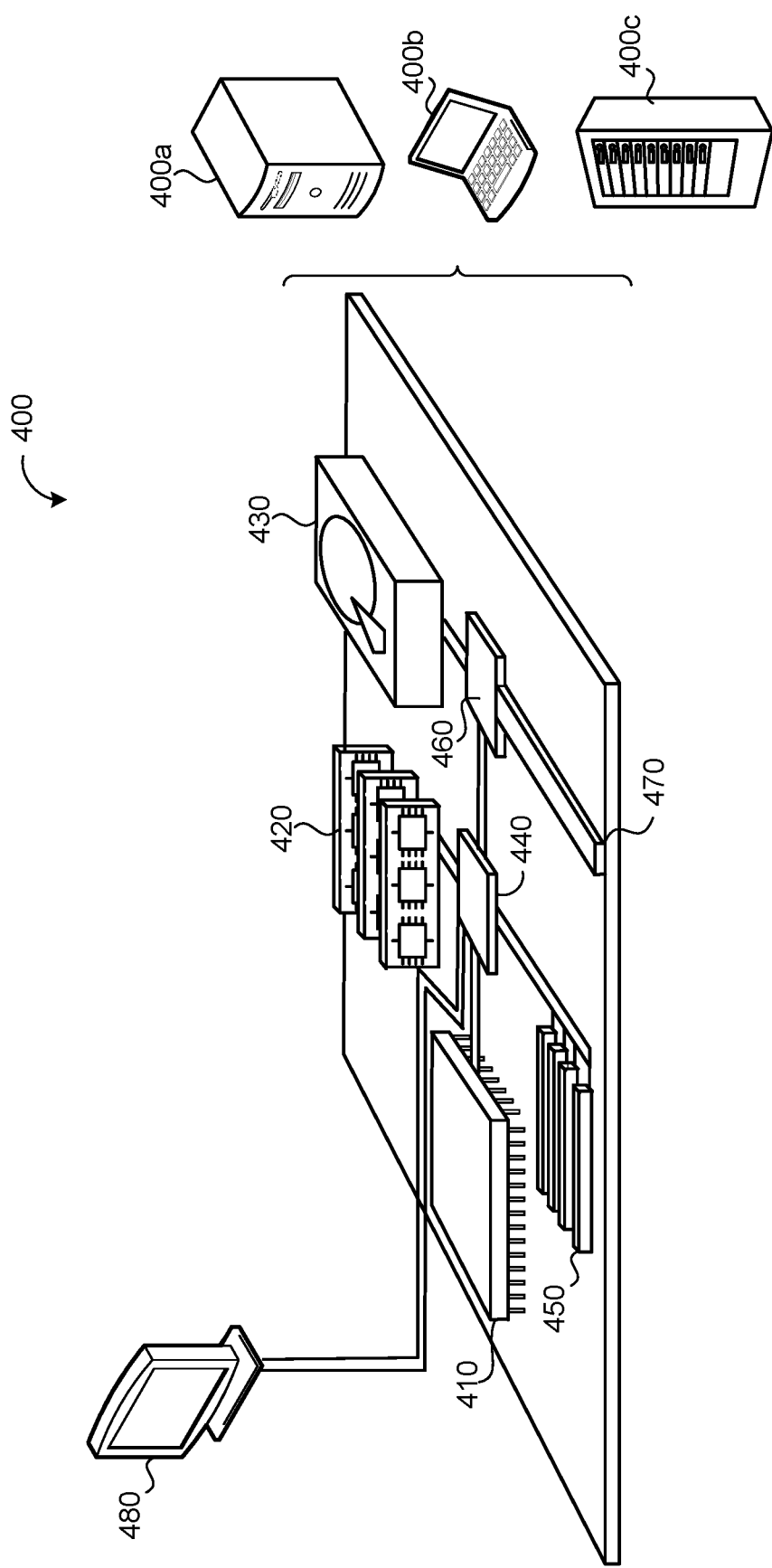
FIG. 4 is a schematic view of an example computing device that may be used to implement the systems and method described herein.

FIG. 4 is schematic view of an example computing device 400 that may be used to implement the systems (e.g., the UNI proxy 200, the primary device 110, and/or the companion device 120) and methods (e.g., method 300) described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor (e.g., data processing hardware) 410, memory (e.g. memory hardware) 420, a storage device (e.g. memory hardware) 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving a request from a mobile device associated with a subscriber of a carrier provider, the request requesting the data processing hardware to establish voice services with the carrier provider for a companion device linked to the mobile device using a phone number of the mobile device, the request comprising a subscriber identifier of the mobile device, the subscriber identifier comprising an international mobile subscriber identity (IMSI);
   authenticating the companion device based on the subscriber identifier of the mobile device;
   obtaining session initiation protocol (SIP) credentials corresponding to the subscriber identifier of the mobile device;
   registering the SIP credentials for the companion device with an internet protocol multimedia subsystem (IMS) of the carrier provider;
   linking the phone number of the mobile device with the companion device; and after the mobile device has established voice services with the carrier provider, establishing voice services between the companion device and the IMS using the SIP credentials.

2. The method of claim 1, wherein the operations further comprise, after registering the SIP credentials with the companion device, communicating media data from the companion device to the IMS of the carrier provider by SIP signaling over a transport layer security connection.

3. The method of claim 2, wherein registering the SIP credentials for the companion device with the IMS of the carrier provider comprises registering the SIP credentials at a network interface proxy.

4. The method of claim 3, wherein the network interface proxy receives the SIP signaling from the companion device and forwards the SIP signaling and a real-time transport protocol (RTP) to the IMS of the carrier provider.

5. The method of claim 4, wherein the RTP corresponds to secure RTP and comprises a key exchange based on datagram transport layer security (DTLS).

6. The method of claim 2, further comprising:
receiving a second request from the mobile device associated with the subscriber of the carrier provider, the second request requesting the data processing hardware to establish voice services with the carrier provider for one or more additional companion devices linked to the mobile device, the second request comprising the subscriber identifier of the mobile device; and
aggregating the one or more additional companion devices and the companion device into a combined companion device.

7. The method of claim 2, wherein communicating the media data comprises transcoding the media data received from the companion device into enhanced voice services (EVS) or adaptive multi-rates (AMR) for the IMS of the carrier provider.

8. The method of claim 2, wherein communicating the media data comprises communicating the media data by a media connection employing sessional traversal utilities for network address translation (STUN), network address translation (NAT) traversal, or interactive connectivity establishment (ICE).

9. The method of claim 1, wherein an application executing on the mobile device generates the request by generating authentication tokens for the subscriber.

10. The method of claim 1, wherein registering the SIP credentials for the companion device with the IMS comprises communicating with a third party registration server.

11. A system comprising:
data processing hardware; and
memory hardware in communication with the data processing hardware, the memory hardware storing instructions that when executed on the data processing hardware cause the data processing hardware to perform operations comprising:
receiving a request from a mobile device associated with a subscriber of a carrier provider, the request requesting the data processing hardware to establish voice services with the carrier provider for a companion device linked to the mobile device using a phone number of the mobile device, the request comprising a subscriber identifier of the mobile device, the subscriber identifier comprising an international mobile subscriber identity (IMSI);
authenticating the companion device based on the subscriber identifier of the mobile device;
obtaining session initiation protocol (SIP) credentials corresponding to the subscriber identifier of the mobile device;
registering the SIP credentials for the companion device with an internet protocol multimedia subsystem (IMS) of the carrier provider;
linking the phone number of the mobile device with the companion device; and
after the mobile device has established voice services with the carrier provider, establishing voice services between the companion device and the IMS using the SIP credentials.

12. The system of claim 11, wherein the operations further comprise, after registering the SIP credentials with the companion device, communicating media data from the companion device to the IMS of the carrier provider by SIP signaling over a transport layer security connection.

13. The system of claim 12, wherein registering the SIP credentials for the companion device with the IMS of the carrier provider comprises registering the SIP credentials at a network interface proxy.

14. The system of claim 13, wherein the network interface proxy receives the SIP signaling from the companion device and forwards the SIP signaling and a real-time transport protocol (RTP) to the IMS of the carrier provider.

15. The system of claim 14, wherein the RTP corresponds to secure RTP and comprises a key exchange based on datagram transport layer security (DTLS).

16. The system of claim 12, further comprising:
receiving a second request from the mobile device associated with the subscriber of the carrier provider, the second request requesting the data processing hardware to establish voice services with the carrier provider for one or more additional companion devices linked to the mobile device, the second request comprising the subscriber identifier of the mobile device; and
aggregating the one or more additional companion devices and the companion device into a combined companion device.

17. The system of claim 12, wherein communicating the media data comprises transcoding the media data received from the companion device into enhanced voice services (EVS) or adaptive multi-rates (AMR) for the IMS of the carrier provider.

18. The system of claim 12, wherein communicating the media data comprises communicating the media data by a media connection employing sessional traversal utilities for network address translation (STUN), network address translation (NAT) traversal, or interactive connectivity establishment (ICE).

19. The system of claim 11, wherein an application executing on the mobile device generates the request by generating authentication tokens for the subscriber.

20. The system of claim 11, wherein registering the SIP credentials for the companion device with the IMS comprises communicating with a third party registration server.

* * * * *